UNITED STATES PATENT OFFICE.

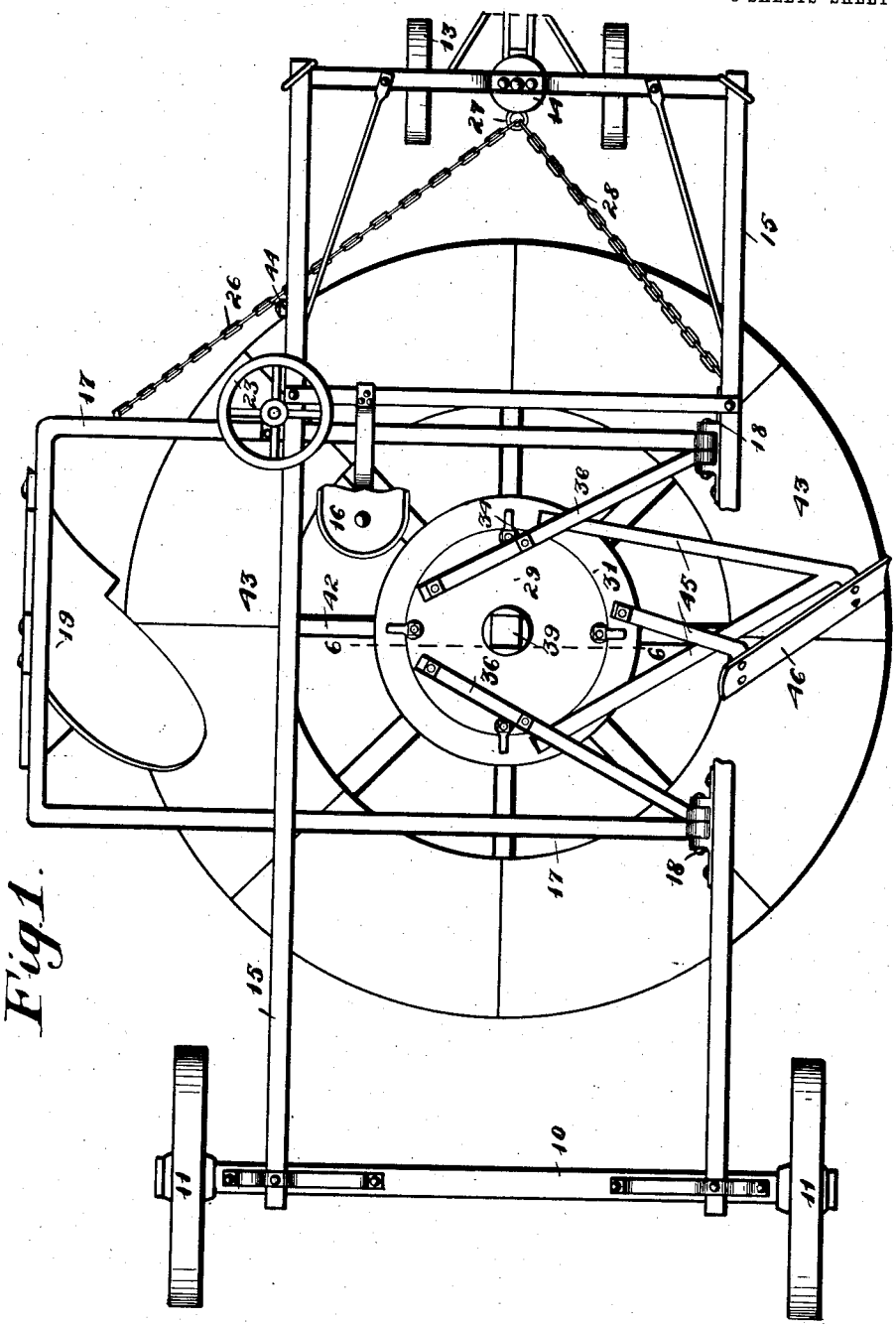

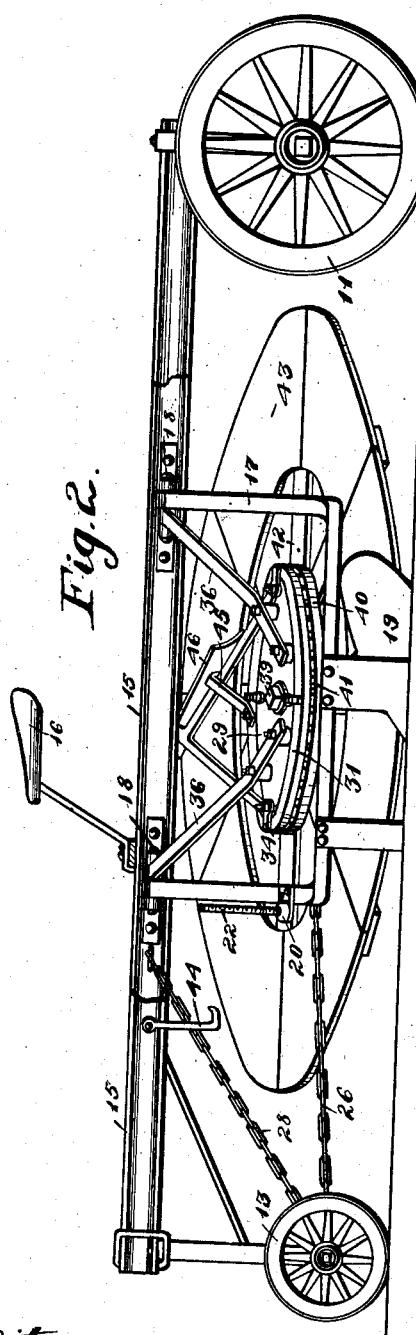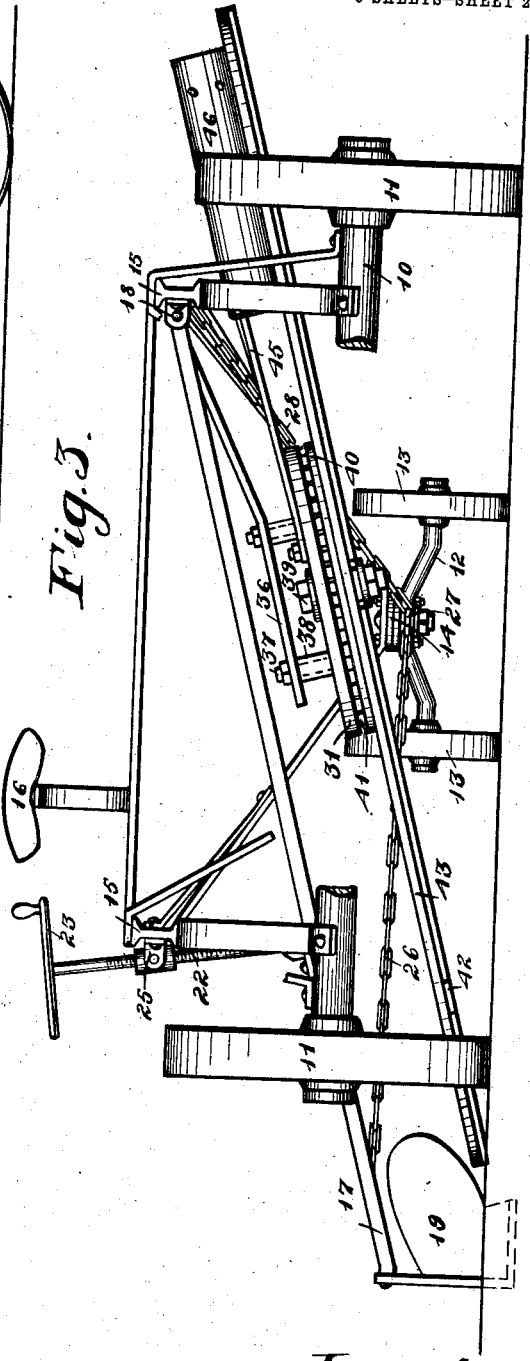

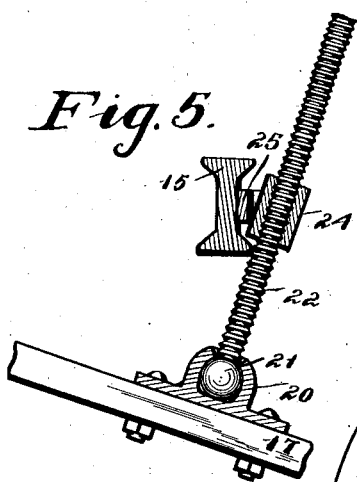
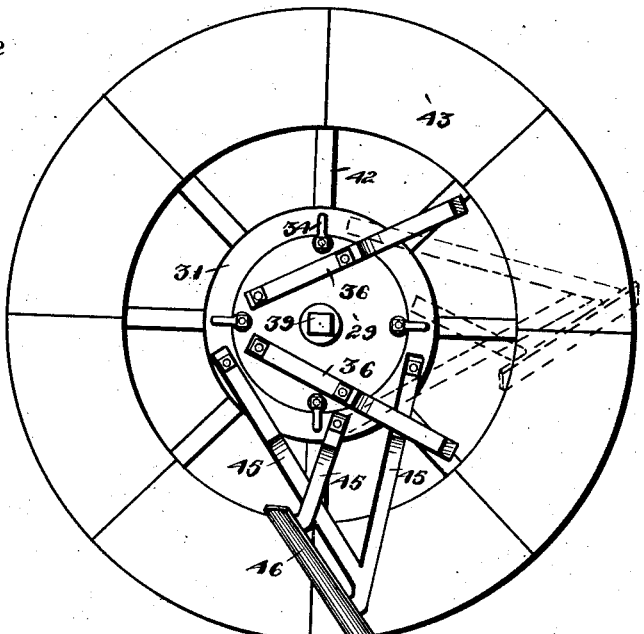

AUGUST J. HANSEN, OF WALNUT, IOWA.

ROAD-GRADER.

1,027,725.  Specification of Letters Patent.  Patented May 28, 1912.

Application filed August 8, 1910. Serial No. 576,165.

*To all whom it may concern:*

Be it known that I, AUGUST J. HANSEN, a citizen of the United States, residing at Walnut, in the county of Pottawattamie and State of Iowa, have invented a certain new and useful Road-Grader, of which the following is a specification.

The object of my invention is to provide a road grader of simple, durable and inexpensive construction and comprising a plow carried at one side of the frame and a conveyer so arranged as to receive material from the plow and to convey it laterally to any desirable point of discharge at the side of the furrow made by the plow either close to said furrow or at a point distant from the opposite side of the frame.

More specifically it is my object to provide a device of this kind in which the conveying apparatus may run close to the plow and close to the ground surface so that the ground need be elevated by the plow only a short distance to load it on the conveyer, and further to provide a conveyer of extremely simple construction that is not liable to get out of order and that may be operated by a minimum of friction or applied power by being driven by reason of its contact with the ground surface.

A further object is to provide an improved scraping device for automatically removing the ground from the conveying device at any desired point.

A further object is to provide improved and simplified means for vertically adjusting the plow so that it may cut into the ground a desired depth, which device may be conveniently manipulated by an operator on the machine frame.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a complete road grader embodying my invention. Fig. 2 shows a side elevation of same with parts of the frame broken away to show details of construction. Fig. 3 shows a rear end elevation of same. Fig. 4 shows a top or plan view of the conveying and delivering mechanism. The dotted lines in said figure show the position of the delivering scraper adjusted to remove ground from the conveyer at a point midway between the loading point and the discharge point farthest from the loading point. Fig. 5 shows an enlarged, detail view illustrating the mechanism for elevating the plow bearing frame, and Fig. 6 shows an enlarged, detail, sectional view on the line 6—6 of Fig. 1.

Referring to the accompanying drawings, I have used the reference numeral 10 to indicate the rear axle upon which the supporting wheels 11 are rotatably mounted.

The reference numeral 12 indicates the forward axle much shorter than the rear one and provided with the supporting wheels 13. At the center of the forward axle is a turn table 14 of ordinary construction. Supported upon the two axles is a frame which preferably comprises eye-beams 15 at the sides thereof, which eye-beams are elevated above the rear axle. Mounted upon the frame is a driver's or operator's seat 16.

The means for cutting into the ground and for delivering ground to the conveying apparatus comprises a plow supporting frame 17 pivoted at one end to the pivot pins 18 which are connected to the inner surface of one of the eye-beams 15. Said frame 17 extends under the opposite frame member 15 and to a point beyond said latter frame member. At the outer end of this plow supporting frame, I have fixed a plow 19 of ordinary construction arranged to discharge earth upwardly and inwardly toward the longitudinal center of the machine.

In order to vertically adjust the plow supporting frame, I have provided a socket 20 fixed thereto and in said socket is a ball 21 rotatably supported. Connected to this ball is a screw threaded shaft 22 which is provided on its upper end with a hand wheel 23 located in such a position as to be readily accessible to the driver's or operator's seat. The shaft 22 extends through a screw threaded sleeve 24, which sleeve is swiveled to the bracket 25 fixed to the adjacent beam 15, of the frame as clearly shown in Fig. 5. Obviously by manipulating said hand wheel the plow supporting frame may be raised or lowered and firmly fixed in any position of its vertical adjustment relative to the frame.

In order to brace the outer end of the plow supporting frame, I have connected thereto a chain 26, which chain extends forwardly and inwardly to the forward central portion of the machine frame where it is connected to a ring 27 and this ring is in turn braced and supported by means of a chain 28 connected to it and to the beam 15 on the opposite side of the machine frame.

My improved device for conveying material from the plow to a point of discharge comprises a central supporting disk 29 having an outwardly projecting rib 30 at the top of its periphery, which rib is fitted into a corresponding groove formed in an annular ring 31, whereby the said ring 31 may be permitted to rotate relative to the disk 27 and said ring is also prevented from moving upwardly relative to the disk on account of said annular rib 30.

In order to hold the ring 31 against rotary movement relative to the disk 29, I have provided a series of bolts 32 extended through the disk 29 to engage and support the collars 33, each of which is provided with an arm 34 to overlap the ring 31. Each bolt is also provided with a nut 35 by which said collars 33 are firmly secured in position. To adjust the ring 31 relative to the disk 29 the nuts 35 are first loosened, whereupon the ring 31 may freely turn and then when said nuts are tightened the ring 31 will be firmly held against rotary movement.

I have provided for supporting the disk 29 from the machine frame by means of two supporting arms 36 which supporting arms are pivoted to the pivot pins 18 and are connected to the disk 29 by means of bolts 37. I also preferably provide tubular standards 38 between the arms 36 and the disk 29 to space the arms 36 above the disk. In the center of the disk 29 is a bolt 39 to support a rotatable disk 40. Between the rotatable disk 40 and the disk 29 is a series of bearing balls 41 which operate in suitable race-ways formed in the ring 31 and the disk 40, as clearly shown in Fig. 6. Secured to the under surface of the rotatable disk 40 is a series of radial spokes 42 and mounted upon and carried by these spokes is a circular earth conveying platform formed of segmental flat metal plates 43. The diameter of this platform is such that its sides project a considerable distance beyond the sides of the main machine frame. It is supported by the arms 36 in such a manner that the edge of the disk that is adjacent to the plow may rest upon the ground surface and the edge thereof on the opposite side will stand spaced apart from the ground surface a considerable distance as clearly shown in Fig. 3. The edge that is resting upon the ground may obviously freely move up and down on account of the pivotal support.

When the machine is not in use as a grader and is being transported from place to place I elevate the lower end of the conveyer platform and support it in an elevated position on the hook 44 which is pivoted to the adjacent beam 15 of the main frame.

In order to provide for automatically removing ground from the conveying device, I have fixed to the ring 31 a number of supporting arms 45, which arms are attached to a scraper blade 46, said blade being so shaped and positioned that its lower edge will rest upon the top surface of the conveyer and incline at such an angle relative to a radial line that earth on the conveyer will be engaged by said scraper blade and discharged outwardly beyond the periphery of the conveyer. When said scraper blade is placed in the position shown in Fig. 3; that is to say, at the side of the conveyer opposite from the plow earth will be discharged by it to a point beyond the opposite side of the machine frame from the plow. However the ground may be discharged from the conveyer at any desired point from the plow by simply turning the ring 31 to the desired position and securing it therein. In Fig. 4 an adjusted position of this scraper blade is shown by dotted lines.

In practical use and assuming that the parts are adjusted to the positions shown in Fig. 3, it is obvious that as the machine is advanced over a roadway the plow will cut a furrow and the plow share will deliver the ground from the furrow upon the adjacent edge of the conveyer. In this connection one of the material advantages of my invention is that the conveyer is so shaped and arranged relative to the plow that all of the ground delivered by the plow will be received upon it and the plow may be so shaped that it need not elevate the ground any considerable distance as the adjacent edge of the conveyer rests upon the surface of the ground and said conveyer of itself comprises only a thin metal plate. Furthermore the operator may readily and easily adjust the position of the plow relative to the ground by manipulating the hand wheel 23.

My improved means for conveying the earth to the ground laterally is obviously of simple and inexpensive construction and at the same time it operates with a minimum of friction or applied power and I dispense with the use of gearing devices in its operation. Its outer edge rests upon the ground surface and as the machine is advanced over the ground the friction will be sufficient to rotate the conveyer device and this rotation will carry the earth from the plow upwardly and laterally toward the opposite side of the machine frame.

Another one of the advantages of my invention is that the machine may be readily and quickly adapted to discharge material either at a point close to the furrow that is being made or at a point beyond the opposite side of the machine frame, or at any desired point between these two extremes. Under ordinary circumstances I have found that the frictional contact of the conveyer plates with the ground is sufficient to rotate the conveyer and carry the ground thereon to the desired point of discharge. However under some conditions it is desirable to have means on the under side of the conveyer for engaging the ground to prevent the conveyer from sliding along the ground without being rotated and for this purpose I have provided the spokes 42 under the plates of the conveyer, the outer ends of which may engage the ground surface and thus prevent the conveyer plates from slipping relative to the ground surface.

In a device of this kind it is desirable that the plow supporting frame and the conveyer supporting arms be both pivoted at the same pivotal center so that no matter at what elevation relative to the rest of the frame the plow and conveyer are working they will maintain substantially the same respective positions.

One of the material advantages of my invention, as compared with ordinary road scraping devices and also with the road graders that employ endless conveyer chutes, is that the operator may remove earth from any desired part of a roadway and deposit it at any other desired point, whereas with the use of a scraper ground can only be deposited along a line at the discharge end of the scraper and by the use of an endless conveyer device it can only be discharged at the discharge end of said conveyer device, whereas with my improved device it may be delivered along a line close to the line where it is removed or along a line spaced apart a considerable distance therefrom; that is to say, the operator of my improved grader has an absolute control of the discharge point and can therefore build up a road in such a manner as to produce a uniform well rounded roadway.

I claim as my invention:

1. An improved road grader, comprising a frame, supporting wheels for the machine frame, a plow supporting frame pivoted to the machine frame, a plow carried thereby, means for vertically adjusting said plow supporting frame, a circular platform rotatably mounted beneath said machine frame, a scraper blade designed to engage the top surface of said platform and deliver material to a point beyond the periphery of said platform, and means for adjusting said scraper blade relative to said platform, said means comprising a rotatable annular ring mounted on a stationary disk above said platform, means for clamping said ring to the disk, and connecting pieces fixed to said annular ring and to the scraper blade, substantially as and for the purposes stated.

2. An improved road grader, comprising a frame, supporting wheels for the machine frame, a plow supporting frame pivoted to one side of the machine frame and extending beneath the opposite side of said frame, a plow secured to said frame, means for vertically adjusting said plow supporting frame, a rotary conveyer beneath said machine frame having one edge adjacent to the plow and in contact with the ground surface and the other edge apart from the ground, and means for pivotally supporting said conveyer, said means comprising supporting arms pivoted to the same side of the machine frame as the plow supporting frame and at points in line with the pivotal points of said plow supporting frame, a stationary disk fixed to said supporting arms, a second disk rotatably mounted beneath said stationary disk, and radial spokes fixed to said rotatable disk and extending outwardly to serve as supports for said conveyer substantially as and for the purposes stated.

Des Moines, Iowa, July 27, 1910.

AUGUST J. HANSEN.

Witnesses:
J. F. RONNA,
ANNA RONNA.

---

Copies of this patent may be obtained for five cents each, by addressing the "Commissioner of Patents, Washington, D. C."